June 19, 1956 K. FEDERN ET AL 2,751,262
RESILIENT BEARING SUPPORT FOR BALANCING MACHINES
Filed Jan. 25, 1952 2 Sheets-Sheet 1

Inventors
Klaus Federn, Karl Ohly
and Heinz Haardt
By Knight Bros.
Attorneys

June 19, 1956 K. FEDERN ET AL 2,751,262
RESILIENT BEARING SUPPORT FOR BALANCING MACHINES
Filed Jan. 25, 1952 2 Sheets-Sheet 2
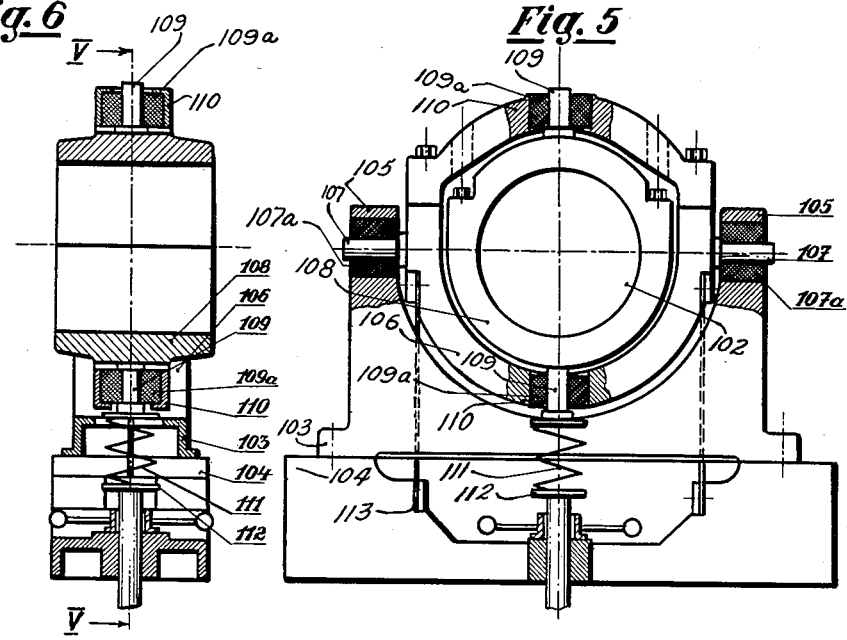
Inventors
Klaus Federn, Karl Ohly
and Heinz Haardt
By Knight Bros.
Attorneys

United States Patent Office 2,751,262
Patented June 19, 1956

2,751,262

RESILIENT BEARING SUPPORT FOR BALANCING MACHINES

Klaus Federn and Karl Ohly, Darmstadt, and Heinz Haardt, Darmstadt-Eberstadt, Germany, assignors to Carl Schenck Maschinenfabrik G. m. b. H., a corporation of Germany Application January 25, 1952, Serial No. 268,178

16 Claims. (Cl. 308—26)

Our invention relates to elastically yieldable bearing structures for revolvable bodies, such as used in balancing machines for journalling a workpiece to be analyzed for unbalance.

Revolving workpieces or other bodies, hereinafter briefly called rotors, enter into the range of bending oscillations if revolving at speeds above half the value of their lowest natural frequency. In this condition, as far as mass behavior is concerned, the rotors are no longer rigid but must be considered to be elastic. Bending oscillations affect the steadiness of revolution even if the rotors have previously been balanced by the customary methods at revolving speeds below half the speed value of their fundamental natural frequency and even if the degree of balance thus obtained is as high as obtainable with good balancing machines. This is significant for the rotor bearing means as well as for the balancing method to be used. For instance, the customary low-speed balancing of a rotor in two axially spaced balance-correction planes must be followed by a balancing at revolving speeds within the range of bending oscillations if the rotor, in its actual use, is to run at speeds within that range.

The speed-dependent bending deformation and the critical revolving speeds of an elastic rotor are determined by its shape and by certain conditions which, mathematically, represent marginal or limit conditions and which, physically, manifest themselves as journalling conditions. A smooth shaft, for instance, which at both sides—to follow the mathematical way of expression—is articulately journalled, i. e. runs in pendulous or gimbal bearings whose outer gimbal pivots are rigidly supported, has near its lowest critical revolving speed a shape of bending deformation approximately similar to one half of a sinusoidal wave with zero or nodal points in the two bearings, this deformation being due to the residual unbalance moments still inherent in the shaft. The deformed shaft axis then extends in a plane revolving with the shaft. If the same shaft has both ends "free," i. e. journalled in softly-sprung bearings, its shape of deformation has two nodal points on the shaft axis between the two bearings. In this case the critical revolving speeds are higher than with the shaft journalled in externally rigidly supported pendulous bearings. In "free" journals and at speeds approaching the critical value, the bearing center points move on a small circle in a radial plane, this movement being due to the bending deformation of the shaft.

In modern balancing machines, the rotor bearings, generally, are softly sprung ("free" journals) in the horizontal direction and are pendulous about rigid pivot points (articulate journals) in the vertical direction. Consequently, the fast revolving rotor varies its shape of deformation during each full revolution. If the crest of the deformation in the middle of the rotor is just passing through the apex of revolution, the bearings act as rigidly supported pivot points at which the two nodes develop. After one quarter revolution the plane of deformation passes, for instance, through the rearmost point of revolution. Now the journal is "free" (soft). The two nodes shift inwardly along the rotor axis and the two bearings move from their middle position. Hence, the rotor when revolving near its critical speed periodically varies its shape during each individual revolution. This variation, being by no means limited to only slight lateral displacements of its nodal points from and to the bearing centers, is appreciable because with articulate journals the bending deflection is especially large near the critical speed when the plane of deformation is vertical. After one quarter of revolution, the plane of deformation has a location in which the "free" journal is effective so that then the critical speed is considerably higher and the bending deformation of the rotor considerably smaller.

The described periodic shape variations occur with any rotor revolving at a speed at which the rotor behaves as an elastic body. In machines other than balancing machines, the difference in the journal conditions between the vertical and horizontal directions is not as large. Nevertheless, the elastic displacement of the bearings and its influence, equivalent to masses placed upon the rotor ends, remains different in the two main directions. With vertical bearing movements a symmetrical machine base plate must participate in the up and down oscillations relative to the machine foundation, while horizontal bearing movements impose tilting moments upon the base plate. In such other machines, therefore, an accurate journalling of the revolving bodies may also play a decisive role for an oscillation-free operation of the machinery.

It is an object of our invention to eliminate the above-mentioned and other deficiencies inherent in the known bearing structures of balancing and other machines. More particularly, our invention aims at designing the bearing structures so that they have substantially the same essential oscillatory properties in the vertical and horizontal directions, i. e. have in both directions as nearly as possible the same elasticity and the same mass behavior so as to represent a radially isotropic journal.

According to the invention, the bearing structure for journalling a rotor in balancing machines, or other machines requiring a balanced and steady run of a rotor, are equipped with respective elastic bearing supports which are yieldable in two respective planes angularly related and preferably perpendicular to each other and whose elastic properties are dependent upon the revolving speed so that the bearing supports resist torsional oscillations or movements of the bearings about the rotor axis at high-speed revolution while otherwise permitting a linear, circular or elliptic oscillation of the bearings.

In balancing machines with radially isotropic journals according to the invention, the occurrence of resonance does not aggravate the balance analyzing performance. This is so because with such journals only one critical revolving speed occurs corresponding to the fundamental natural frequency of the rotor. At a revolving speed in the vicinity of this critical speed, the rotor runs with a bending deformation that does not vary appreciably during the revolution. Hence, the center points of the bearings move in good approximation on a small circle whose radius and phase position is a measure of the magnitude and angular position of the unbalance corrections to be attached in the three correction planes for unbending the rotor axis. Also, when passing through resonance, only relatively slight oscillatory forces are transmitted to the frame structure and foundation of the machine. The circular movement of the bearings, if desired, may be damped by known oscillation damping means such as rubber cushions. Depending upon the running properties of the various rotors, the isotropic journalling devices according to the invention may be modified in adaptation to the particular requirements.

The advantages of bearing structures according to the invention will especially be realized when considering the various requirements desired from radially elastic bearing means in balancing machines for high-speed rotors. These requirements, desired for improving the balance measurement or for safety reasons, are as follows:

(1) Revolving movements of the bearing bushings about their own axis must be prevented.

(2) It should be possible to equalize or counterbalance the weight of the rotor and bearing structure, for instance by adjustable springs, to permit aligning the rotor axis with that of the machine drive.

(3) The bearing structure should have high stiffness against axial forces.

(4) The bearing structure should be elastically yieldable in the vertical direction but should have a speed of resonance below the revolving speed of the balancing operation to be performed within the range of bending deformation of the rotor.

(5) In some cases, uncontrolled pendulous movements of the bearings about a geometrical axis vertical to the rotor axis should be prevented; or alternatively, in other cases (6) such pendulous movements should be possible about one or two geometrical axes perpendicular to the rotor axis.

As will be shown, bearing structures according to the invention jointly satisfy most of these desiderata to an extent not attainable with the rotor journalling devices heretofore known for such purposes.

The above-mentioned and more specific objects, advantages and features of our invention, these features being set forth with particularity in the claims annexed hereto, will be apparent or will be referred to in the following description in conjunction with the drawings, in which:

Fig. 4 shows in perspective another modification of a balancing-machine bearing structure; and Figs. 5 and 6 illustrate respectively a radial and axial cross sectional view of one of the two bearings according to Fig. 4, the sectional plane of Fig. 5 being indicated in Fig. 6 at V—V.

The three embodiments illustrated in Figs. 1 to 3 are to some extent similar and for that reason are provided with the same reference numerals for respectively similar elements.

Figure 1:
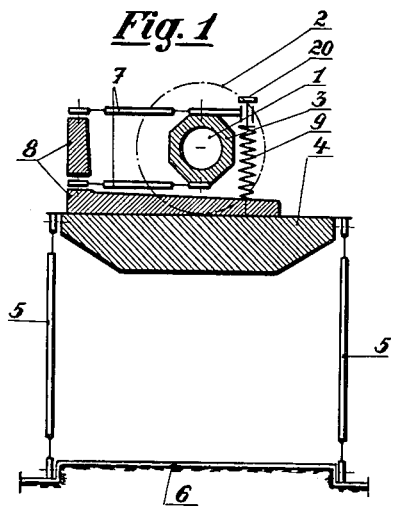
Figs. 1 to 3 show schematically and in cross section three respective bearing structures for rotor balancing machines.
Figure 2:
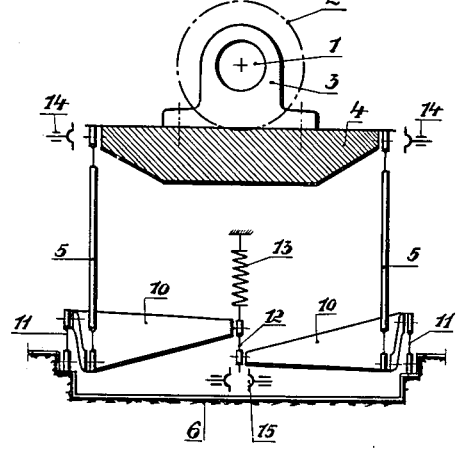
Figure 3:
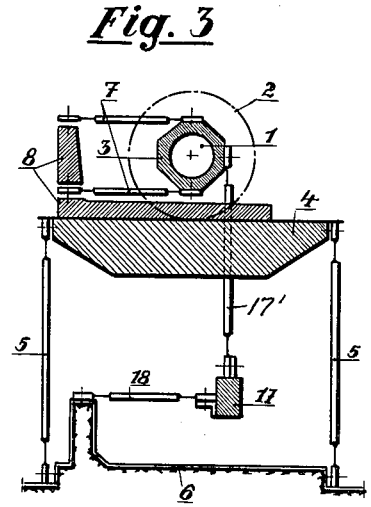

Each of Figs. 1 to 3 shows one of the two bearing structures for journalling a rotor in a balancing machine. Each end of the shaft 1 of the rotor 2 to be balanced runs in a bearing member 3. A rigid bridge piece 4 for supporting the bearing member is carried by two vertical linking struts 5 acting essentially as leaf springs. By means of these struts 5 the bridge 4 is guided for parallel motion in the horizontal direction transverse to the rotor axis while revolving movements of the bridge within the plane of motion are prevented. During the balancing performance, the revolving rotor, if unbalanced, causes the bearing members 3 and the bridge 4 to oscillate, and the oscillations of the bearing member or bridge are analyzed by any of the known means and methods, for instance, with the aid of electric vibration pick-ups (not shown) mechanically coupled with the bearing or bridge structure. The spring struts 5 have their respective lower ends anchored in the frame structure or foundation 6 of the machine.

Figures 1A, 1B:
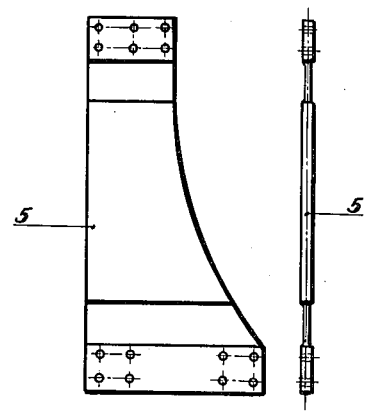
Figs. 1a and 1b show a spring member of Fig. 1 on a larger scale in two mutually perpendicular views respectively.

In the embodiments of Figs. 1, 1a and 1b the bearing member 3 is firmly secured between two spring bars 7 which extend parallel to each other and substantially perpendicular to the spring struts 5. The springs 7 have their respective other ends firmly attached in a rigid part 8 joined with the bridge 4. The springs 7, consisting preferably also of leaf springs, guide the bearing member for parallel motion in the vertical direction and prevent any rotational motion of the bearing member 3 about its bearing axis. The elasticity constant of the spring members 7 is such that the springs are stiff and nearly unelastic at low running speeds of the rotor, or the spring bars 7 have substantially the same spring constant as the spring struts 5 and then form together therewith a radially isotropic journal. The spring members 5 and 7 are rigid in their respective longitudinal directions and their broadsides are all parallel to the bearing axis so that the spring members are also unyielding to forces acting in the direction of the rotor axis. As shown, the elasticity of each spring member may be limited to its two end portions, while the middle portion, extending over most of the length of the member, may be reinforced to be rigid and stiff.

In order to prevent the weight of heavy rotors 1 and of the rotor bars 3 from affecting the zero position of the bearing oscillations, and to readily permit aligning the rotor axis with the axis of the drive (not shown), an auxiliary spring 9 is provided between the upper spring member 7 and the foot portion of the mounting structure 8. The force of the auxiliary spring 9 counterbalances the rotor and bearing weight and to this end is adjustable by means of a screw device 20. With such a weight compensation, the isotropic elasticity of the bearing structure, during the balancing run, is subjected only to the dynamic stresses due to unbalance of the rotor.

In balancing machines for low-speed and high-speed balancing, the natural frequency of the spring members 7, i. e. those elastic supporting elements that are to be yielding in the vertical direction, lies between the frequency of low-speed balancing runs and the frequency of high-speed balancing runs. During low-speed balancing runs, when the spring members 7 are stiff, they act as blocking devices with respect to oscillatory movements in the vertical direction. Only when the revolving speed approaches half the value of the natural frequency of the rotor will this restraining effect cease so as to allow the rotor shaft to rotate substantially in a circle as is caused by the elastic deformation of the rotor. Hence, at such high speeds, the elasticity of the bearing structure is approximately isotropic for all radii. Any tendency toward torsional oscillations of the bearing member 3 about the shaft axis stresses the spring members 5 and 7 in tension or compression to which these members do not yield.

In the embodiment of Fig. 2 the elements denoted by 1 to 6 correspond to those of Fig. 1 as regards their behavior relative to rigidity of the bearing member against revolving. In the embodiment of Fig. 2, however, the spring struts 5 are indirectly supported by the frame structure or foundation for the purpose of providing a vertical elasticity. The struts 5 stand upon supporting levers 10. One end of each lever 10 is linked to the machine frame or foundation 6 by a spring 11 so as to be elastically rotatable relative to the frame. The other ends of the respective levers 10 are coupled with each other by a link 12 also consisting of a leafspring. An adjustable spring 13 is provided for equalizing the weight of the rotor. Arresting devices 14 and 15, mounted on the stationary machine frame are provided for limiting the horizontal as well as the vertical oscillatory movements.

An essential difference between the embodiments of Figs. 1 and 2 in oscillation respects is the fact that in the bearing structure according to Fig. 1 the mass of the structure oscillating together with that of the rotor is smaller in the vertical than in the horizontal direction, while in the devices according to Fig. 2 these conditions are reversed.

The embodiment according to Fig. 3 is devised for the purpose of equalizing the just-mentioned mass difference. As far as this embodiment is similar to Fig. 1 it need not be described in further detail. In distinction from Fig. 1, the bearing member 3 in Fig. 3 is joined with an auxiliary mass 17 by an intermediate leaf-spring link 17'. To prevent the auxiliary mass 17 from uncontrolled movements, an elastic link 18, likewise designed as a leaf-spring, connects the mass 17 with the frame or foundation 6 of the machine.

The bearing structures according to Figs. 1 to 3 generally satisfy the above-mentioned requirements (1) to (5). The requirements (3) and (5) are satisfied especially if the supporting springs of the bearing member and bridge structure consist of leaf-springs, as is the case in the illustrated embodiments. The journal bearing according to Figs. 1 to 3 can be given a substantially accurate isotropic elasticity, and the embodiment of Fig. 3 also permits making the journal radially isotropic with respect to the mass components oscillating together with the mass of the rotor. If the elastically yieldable supporting elements of the bearing structure consist of leaf-springs, as illustrated, and if instead of the requirement (5) the alternative requirement (6) is to be satisfied, then a spherically adjustable intermediate bearing shell must be inserted into the bearing member 3 so that the rotor shaft runs in the pivotally movable shell.

In devices of the type described in the foregoing the springs in one or both of the two linkage sets may also consist of spring rods of circular cross section, provided the spring set is made stiff in the proper direction without eliminating its elasticity relative to the desired bearing oscillations. To this end, the round spring rods pertaining to the same set are arranged in the same plane or in parallel planes but in angular relation to each other so that some or all of them are non-parallel to each other.

In the embodiment shown in Figs. 4 and 6 to be described presently, each bearing member is capable of pendulous motion about two pivot axes perpendicular to the rotor axis in accordance with the above enumerated requirement (6).

In Figs. 4 to 6, the rotor to be balanced is denoted by 101 and the shaft ends of the rotor by 102. The shaft runs in bearings whose respective stationary carriers 103 are mounted on rigidly supported base structures 104. The drive for the rotor is not illustrated since it may be similar to the various drives customary for balancing machines.

Each carrier 103 has two diametrically opposite pivot bearings 105 whose respective cylindrical bores receive the two coaxial pivot pins 107 of a gimbal ring 106. The interior bearing members for receiving the shaft ends 102 of the rotor 101 are disposed within the respective gimbal rings 105. Each bearing member 108 is pivoted in gimbal ring 106 by two coaxial pivot pins 109 jornalled in corresponding bores 110 of the gimbal ring. The axis of the two pivot pins 109 intersects the axis of pivot pins 107 at a right angle. The gimbal ring 106 and the bearing member 108 are both subdivided into two parts to facilitate the insertion and removal of the rotor 101. If desired, the bearing member 108 may be exchangeable for accommodating rotor shafts 102 of respectively different diameters.

According to the invention, the four pivot pins of the gimbal arrangement are elastically supported in their respective pivot bearings. To this end, each pivot pin in the illustrated embodiment is surrounded by an elastic bushing 107a or 109a consisting, for instance, of rubber or the like material. The cross sectional shape of the bushings which, for instance, may be cylindrical as illustrated, or prismatic, depends essentially upon the properties of the elastic bushing material. Each bushing is dimensioned so that it offers little elastic resistance to rotational and axial movements of the pivot pins relative to the respective pivot bearings, while restraining at high resistance any transverse or radial movements of the pins.

The pivots and elastic bushings should preferably be relieved of the weight of the rotor. This can be done in a simple manner, for instance, by providing for the upper pivot pin 109 a resilient suspension or for the lower pivot pin 109 a resilient support. Figs. 5 and 6 show schematically an embodiment of the latter kind. A supporting spring 111 is inserted and placed under stress between the lower pivot pin 109 and an adjustable abutment 112.

In balancing machines with oscillation-indicating instruments equipped, for instance, with electric oscillation pickups of the moving-coil type, the feeler elements of these pickups (not shown) are preferably mechanically coupled with the bearing members 108 through the vertical or horizontal pivot pins so that the pickups directly respond to the oscillations of the bearing member for detecting the unbalance components to be determined.

It should be understood that the illustrated embodiments represent only some of the possible embodiments of the invention. For instance, it is also possible to combine the various components of the described embodiments, for instance, by providing parallel-motion spring links for the horizontal direction of oscillation and rubber sleeves for the vertical direction. Designs of the kind customary for the parallel-motion guides of the teeter bar in weighing scales may also be used to advantage in devices according to the present invention.

We claim:

1. An elastically yieldable rotor bearing structure, particularly for balancing machines, comprising a rigid base, a bearing member for journalling the rotor, elastic supporting means vibratorily connecting said bearing member with said base and having two sets of elastic structures serially joined with each other and deflectable in mutually perpendicular directions within a plane perpendicular to the axis of rotation within said bearing member, both said sets being highly resistant to motion along said axis of rotation, said elastic structure of each set having an elastic characteristic of high resistance to torsional oscillations of said bearing member in said plane.

2. In a bearing structure according to claim 1, said bearing member having two diametrically opposite first pivot means, a gimbal ring surrounding said bearing member and in journalling engagement with said first pivot means, said gimbal ring having two diametrically opposite second pivot means perpendicular to said first pivot means, said rigid base being engaged by said second pivot means, and said two sets of elastic structures consisting essentially of bushing structures of elastic material disposed between each of said pivot means and said gimbal ring and base respectively, each of said bushing structures being yieldable in radial directions and highly resistant in the axial direction of the pertaining pivot means.

3. In a bearing structure according to claim 2, said bearing member and said gimbal ring being peripherally subdivided, each of them having a removable portion.

4. In a bearing structure according to claim 2, said bearing member being exchangeable in said gimbal ring.

5. In a bearing structure according to claim 2, said first pivot means having a vertical axis, a vertically adjustable abutment disposed on said base beneath said gimbal ring, and a weight equalizing spring disposed between said abutment and said first pivot means.

6. An elastically yieldable bearing structure for rotors, particularly in balancing machines, comprising a rigid base, a bearing member for journalling the rotor, and elastic supporting means joining said bearing member with said base and having high resistance to high-speed circular oscillations of said bearing in a radial bearing plane and an otherwise slight resistance to bearing oscillations in said plane, said supporting means having a group of mutually spaced leaf-spring members extending substantially vertically and being connected with said base, and a group of mutually spaced leaf-spring members extending substantially horizontally and being serially joined with said group of vertical leaf-spring members and connected with said bearing member whereby said bearing member is prevented from torsional oscillations in said plane, all of said leaf spring members being of straight shape and rigid in the axial direction of the bearing structure.

7. An elastically yieldable bearing structure for rotors, particularly in balancing machines, comprising a rigid base, a bearing member for journalling the rotor, and elastic supporting means joining said bearing member with said base and having high resistance to high-speed circular oscillations of said bearing in a radial bearing plane and an otherwise slight resistance to radial bearing oscillations in said plane, said supporting means having vertically elastic parallel-motion guide means mounted on said base and horizontally elastic parallel-motion guide means mounted on said vertically elastic means in serial relation thereto and connected with said bearing member at spaced peripheral points thereof.

8. A bearing structure according to claim 6, comprising two swing levers pivotally mounted on said base and having respective vertical planes of pivotal movement, said two levers having respective free ends coupled with each other, and said vertical leaf-spring members being supported on said respective levers at respective lever points between the pivot axis and the free end.

9. With a bearing structure according to claim 7, in combination, force-adjustable spring means connected with said supporting means and having a force directed in opposition to the weight of the rotor and radially isotropic relative to said bearing member.

10. With a bearing structure according to claim 7, in combination, an auxiliary mass joined with said bearing member and oscillatorily movable together therewith in a given direction so as to equalize mass differences between oscillations in vertical and horizontal directions respectively, and restraining means joined with said auxiliary mass for limiting it to motion in said given direction.

11. A bearing structure according to claim 1, each of said sets of elastic structures having an arresting device mounted on said base and engageable with said set of structures.

12. In a balancing machine for low-speed and high-speed balancing of rotors, a bearing structure according to claim 7 wherein said vertically elastic means have a natural frequency above that of low-speed balancing and below that of high-speed balancing.

13. An elastically yieldable bearing structure for rotors, particularly in balancing machines, comprising a rigid base, a bearing member for journalling the rotor, and elastic supporting means joining said bearing member with said base and having high resistance to high-speed torsional oscillations of said bearing in a radial bearing plane and an otherwise slight resistance to radial bearing oscillations in said plane, said supporting means having vertically elastic parallel-motion guide means and horizontally elastic parallel-motion guide means serially joined with each other, said vertically elastic guide means being mounted on said base, said horizontally elastic guide means being mounted on said vertically elastic guide means and connected with said bearing member at spaced peripheral points thereof, said vertically elastic guide means and said horizontally elastic guide means having the same degree of elasticity so that the resultant elasticity of said supporting means relative to said bearing member is substantially radially isotropical.

14. In a bearing structure according to claim 13, each of said elastic parallel-motion guide means being substantially rigid in the axial direction of said bearing member.

15. In a bearing structure according to claim 6, said leaf-spring members of both groups having their respective broad sides extending substantially parallel to one another and parallel to the axis of said bearing member so that the totality of said leaf-spring members is stiff in the direction of said axis, whereby axial as well as conical pendulous movements of said bearing member are prevented while permitting circular and elliptic oscillations of the bearing center point in said radial bearing plane.

16. In a bearing structure according to claim 1, said two sets of serially joined elastic structures being elastically deformable in horizontal and vertical directions respectively, said horizontally deflective structures being resistant to vertical motion, said vertically deflective structures being resistant to horizontal motion, and said joined structures as a whole being elastically soft to radial and conically pendulous oscillations of said bearing member.

References Cited in the file of this patent

UNITED STATES PATENTS

| | | |
|---|---|---|
| 110,259 | Martinson | Dec. 20, 1870 |
| 1,210,085 | Leblanc | Dec. 26, 1916 |
| 1,306,951 | Cruthers | June 17, 1919 |
| 1,915,058 | French | June 20, 1933 |
| 2,137,434 | Wood | Nov. 22, 1938 |
| 2,196,031 | Schildmeier | Apr. 2, 1940 |
| 2,450,279 | Guy | Sept. 28, 1948 |

FOREIGN PATENTS

| | | |
|---|---|---|
| 331,797 | Great Britain | July 10, 1930 |
| 618,596 | Great Britain | Feb. 24, 1949 |